(12) United States Patent
Iguchi (10) Patent No.: US 11,519,778 B2
(45) Date of Patent: Dec. 6, 2022

(54) MONITORING DEVICE AND APPARATUS

(71) Applicant: Seiko Epson Corporation, Tokyo (JP)

(72) Inventor: Shuichi Iguchi, Ina (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/386,011

(22) Filed: Jul. 27, 2021

(65) Prior Publication Data
US 2022/0034709 A1  Feb. 3, 2022

(30) Foreign Application Priority Data
Jul. 28, 2020 (JP) .............................. JP2020-127098

(51) Int. Cl.
*G01H 1/00* (2006.01)
*F04B 39/00* (2006.01)
*F04B 37/14* (2006.01)

(52) U.S. Cl.
CPC .............. *G01H 1/003* (2013.01); *F04B 37/14* (2013.01); *F04B 39/00* (2013.01); *F04B 2201/0802* (2013.01)

(58) Field of Classification Search
None
See application file for complete search history.

(56) References Cited

U.S. PATENT DOCUMENTS 4,744,248 A * 5/1988 Stewart ............... G01P 15/0802
                                                    73/504.04

FOREIGN PATENT DOCUMENTS

JP     H05-072228 A    3/1993
JP     2000-074080 A   3/2000

* cited by examiner

*Primary Examiner* — Raul J Rios Russo
*Assistant Examiner* — Carl F. R. Tchatchouang
(74) *Attorney, Agent, or Firm* — Harness, Dickey & Pierce, P.L.C.

(57) ABSTRACT

A monitoring device is attached to a first leg portion and detects vibration generated in the first leg portion. The monitoring device includes a sensor unit including an inertial sensor, a plate for attachment of the sensor unit, a spacer in contact with the first leg portion, and a bolt for fixation, and is attached to the first leg portion by the bolt with the spacer, the plate, and the sensor sequentially stacked and the spacer is softer than the plate.

14 Claims, 9 Drawing Sheets

MONITORING DEVICE AND APPARATUS

The present application is based on, and claims priority from JP Application Serial Number 2020-127098, filed Jul. 28, 2020, the disclosure of which is hereby incorporated by reference herein in its entirety.

BACKGROUND

1. Technical Field

The present disclosure relates to a monitoring device and an apparatus.

2. Related Art

JP-A-2000-74080 discloses a vacuum pump housing a motor. According to the disclosure, a rotation shaft of the motor is fixed by a pair of bearings. A rotary blade is placed on the rotation shaft and the motor rotates the rotary blade, and thereby, the vacuum pump functions as a pump. When balls of the bearings are deteriorated, the bearings vibrate. According to JP-A-2000-74080, in the vacuum pump, a tilt of the main shaft and displacement in the axial direction may be reduced by damping of the vibration of the bearings in a rotation speed range of the natural vibration frequency of the bearings.

For predictive maintenance of the vacuum pump, attachment of a monitoring device with a sensor unit is considered. The vacuum pump is generally fixed to a floor or a base with leg portions. The vacuum pump main body and many of the leg portions are formed by casting.

However, it is not easy to attach the monitoring device to a vibration source of the vacuum pump or the like. Specifically, it is difficult to reliably fix the monitoring device because the surface of the casting is not even. When fixing is unstable, noise vibration that the monitoring device itself vibrates is generated separately from the vibration source and accurate measurement is difficult. That is, a structure that may reliably fix the monitoring device to the vibration source and detect vibration of the vibration generation source with higher accuracy is required.

SUMMARY

A monitoring device attached to a vibration generation source and detecting vibration generated in the vibration generation source, includes a sensor unit including an inertial sensor, a plate on which the sensor unit is placed, a spacer in contact with the vibration generation source, and a screw configured to attach the spacer, the plate, and the sensor unit sequentially stacked to the vibration generation source, wherein the spacer is softer than the plate.

An apparatus includes a movable body, a housing housing the movable body, and the above described monitoring device attached to the housing.

DESCRIPTION OF EXEMPLARY EMBODIMENTS

First Embodiment

Figure 1:
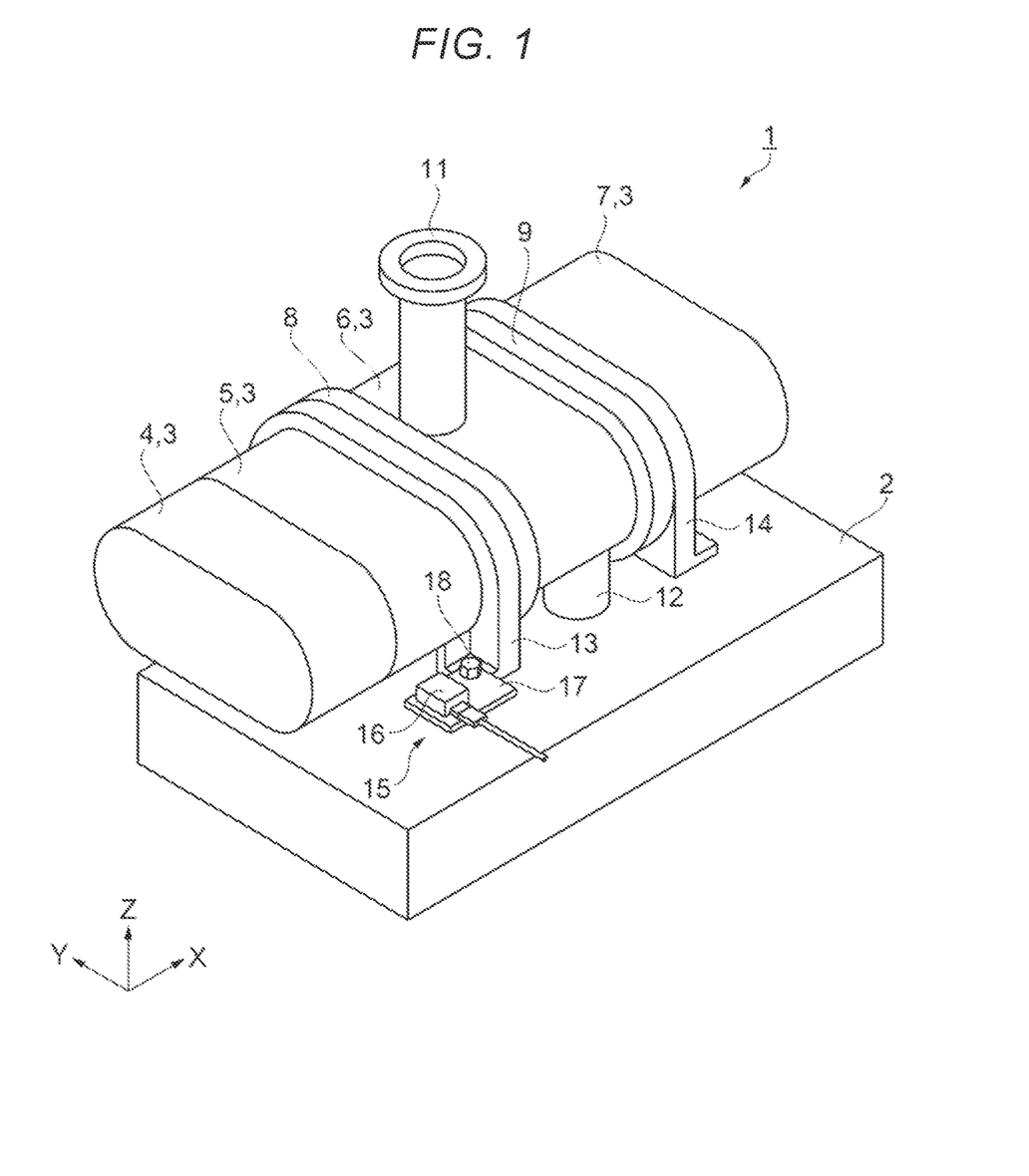
FIG. 1 is a schematic perspective view showing a configuration of a vacuum pump according to a first embodiment.

In this embodiment, characteristic examples of a monitoring device and a vacuum pump to which the monitoring device is attached are explained. As shown in FIG. 1, a vacuum pump 1 as a vibration generation source and an apparatus is placed on a base 2. The vacuum pump 1 is formed in a columnar shape having a substantially oval section. Longitudinal directions of the vacuum pump 1 are referred to as "X directions". Long axis directions of the oval are referred to as "Y directions" and short axis directions of the oval are referred to as "Z directions".

The vacuum pump 1 includes a housing 3. The housing 3 includes a motor case 4, a coupling part 5, a pump case 6, and a gear case 7 placed from the −X direction side toward the +X direction side. A first side wall 8 is placed between the coupling part 5 and the pump case 6. A second side wall 9 is placed between the pump case 6 and the gear case 7.

An intake pipe 11 is coupled to a surface at the +Z direction side of the pump case 6. An exhaust pipe 12 is coupled to a surface at the −Z direction side of the pump case 6.

The coupling part 5 includes a first leg portion 13 and a second leg portion as leg portions and vibration generation sources at the base 2 side. The first leg portion 13 is placed at the −Y direction side and the second leg portion is placed at the +Y direction side. The gear case 7 includes a third leg portion 14 and a fourth leg portion at the base 2 side. The third leg portion 14 is placed at the −Y direction side and the fourth leg portion is placed at the +Y direction side. The housing 3 includes the first leg portion 13. The vacuum pump 1 includes a monitoring device 15. The monitoring device 15 is attached to the first leg portion 13. The monitoring device 15 detects vibration generated in the vacuum pump 1.

The monitoring device 15 includes a sensor unit 16 detecting vibration of the first leg portion 13. The sensor unit 16 includes an inertial sensor. Further, the monitoring device 15 includes a plate 17 on which the sensor unit 16 is placed. Furthermore, the monitoring device 15 includes a bolt 18 as a screw for attaching the plate 17 to the first leg portion 13. The first leg portion 13 is a part of the vacuum pump 1 and acts as the vibration generation source for the sensor unit 16. When the sensor unit 16 detects vibration in three axial directions orthogonal to one another, the attitude of the sensor unit 16 is not limited. The monitoring device 15 may output a waveform of the vibration or output a warning signal from amplitude of the vibration.

Figure 2:
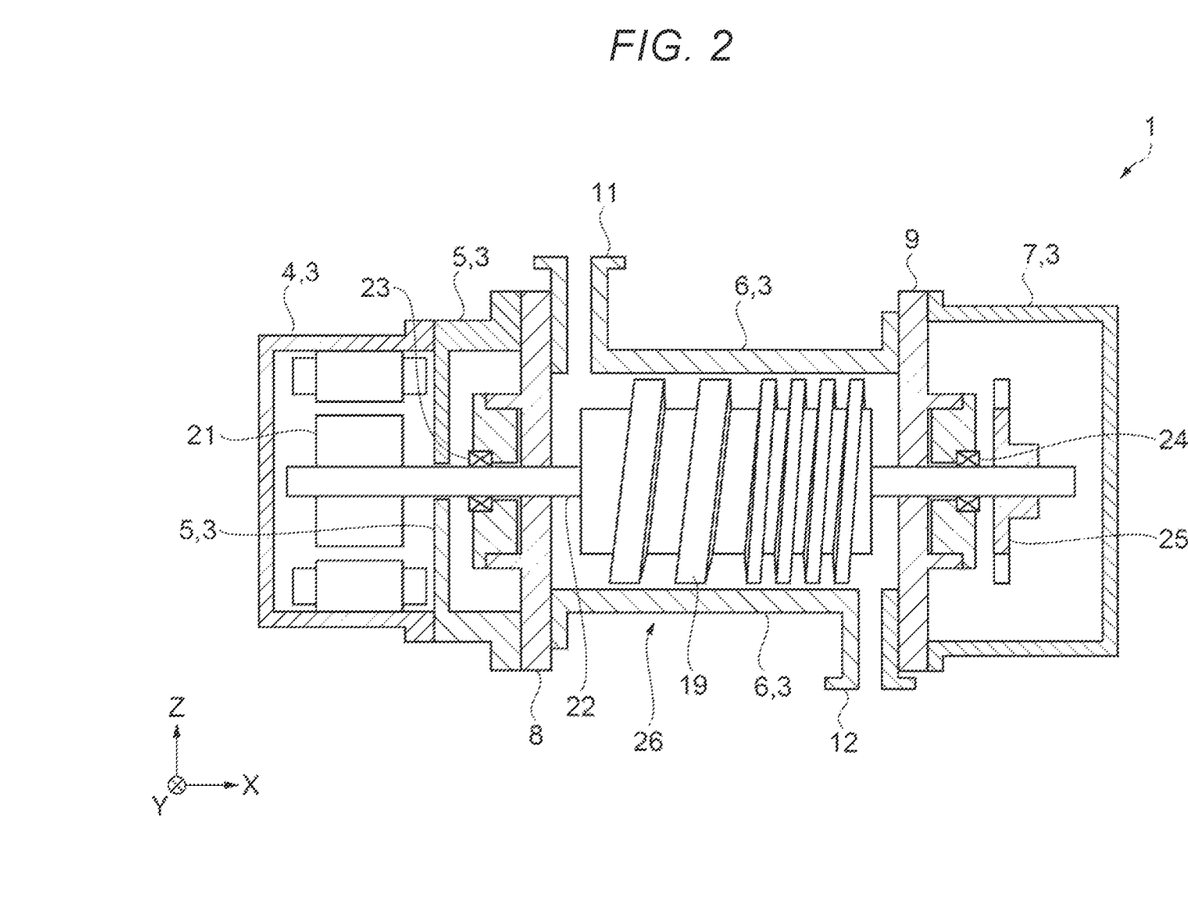
FIG. 2 is a schematic side sectional view showing an internal structure of the vacuum pump.
Figure 3:
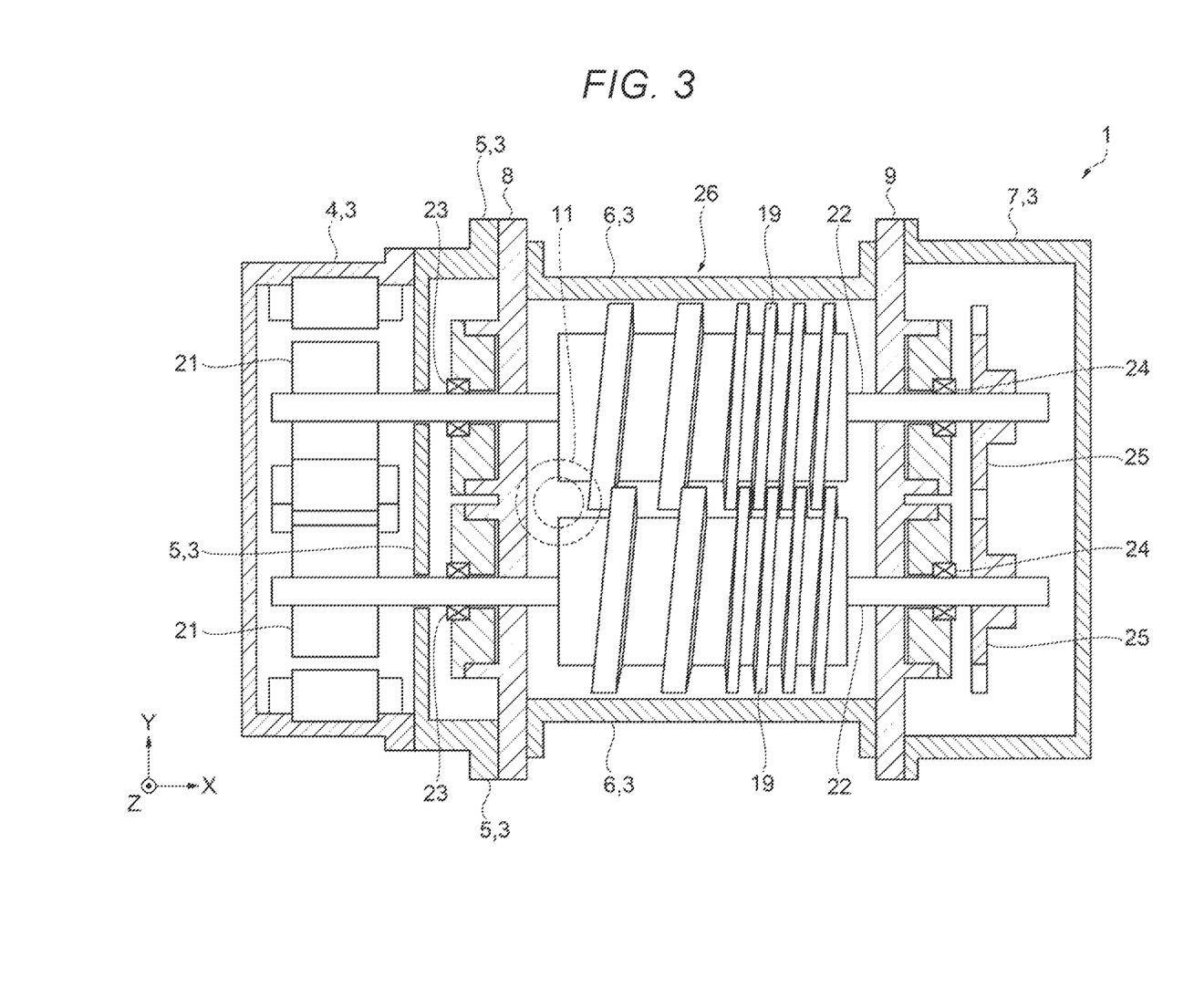
FIG. 3 is a schematic top sectional view showing the internal structure of the vacuum pump.

An internal structure of the vacuum pump 1 is explained in FIGS. 2 and 3. FIG. 2 is a view as seen from the −Y direction. FIG. 3 is a view as seen from the +Z direction. In the drawings, the first leg portion 13 and the monitoring device 15 are omitted. The vacuum pump 1 includes pump rotors 19 as two movable bodies that transfer a gas, and two motors 21 rotating the two pump rotors 19. The pump rotors 19 are placed inside of the pump case 6.

The two pump rotors 19 are respectively fixed to two rotation shafts 22. The two rotation shafts 22 are respectively rotatably supported by a first bearing 23 and a second bearing 24. The two motors 21 are coupled to one ends of the respective rotation shafts 22. The motors 21 are configured to rotate the two pump rotors 19 in synchronization with and in opposite directions to each other. Two timing gears 25 are fixed to the other ends of the rotation shafts 22. The timing gears 25 are provided to secure synchronized rotation of the two pump rotors 19 when the synchronized rotation of the two motors 21 is lost.

The pump case 6 is sandwiched by the first side wall 8 and the second side wall 9. The pump rotors 19 are placed within a pump chamber 26 formed by the first side wall 8 and the second side wall 9.

The first bearing 23 at the intake pipe 11 side is fixed to the first side wall 8 and placed within the coupling part 5. The motors 21 are placed within the motor case 4 fixed to the coupling part 5. The second bearing 24 at the exhaust pipe 12 side is fixed to the second side wall 9. The timing gears 25 and the second bearing 24 are placed within the gear case 7. The first bearing 23 and the second bearing 24 vibrate by the rotation of the pump rotors 19. The vibration of the first bearing 23 and the second bearing 24 is transmitted to the housing 3 and the first leg portion 13 via the first side wall 8 and the second side wall 9.

Figure 4:
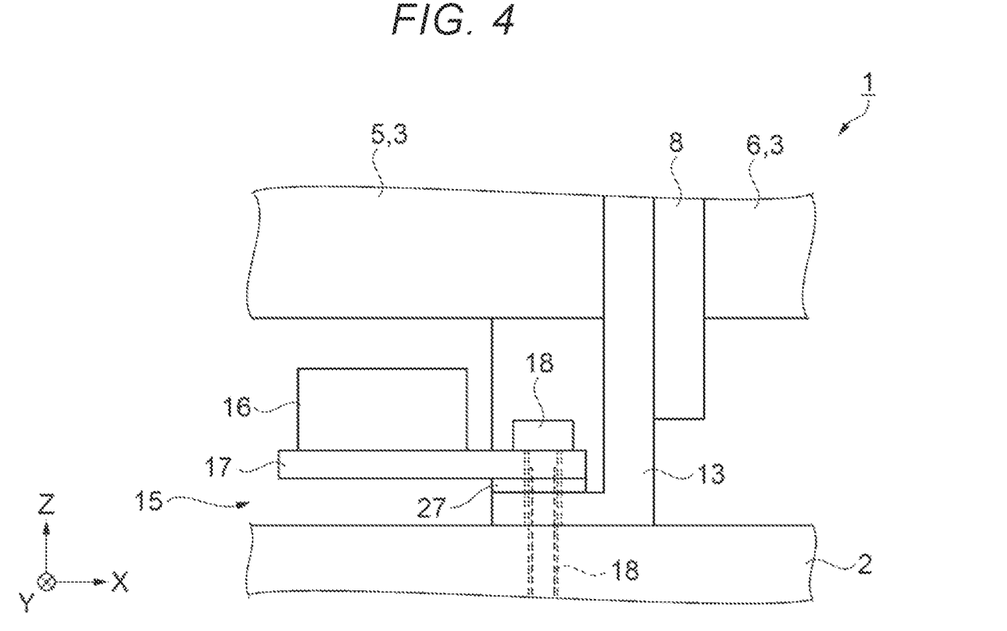
FIG. 4 is a schematic side view of a main part showing a placement example of a monitoring device on a first leg portion.

As shown in FIG. 4, the monitoring device 15 includes a spacer 27 in contact with the first leg portion 13. With the spacer 27, the plate 17, and the sensor unit 16 sequentially stacked, the sensor unit 16 is attached to the first leg portion 13 by the bolt 18. The spacer 27 is softer than the plate 17.

Figure 5:
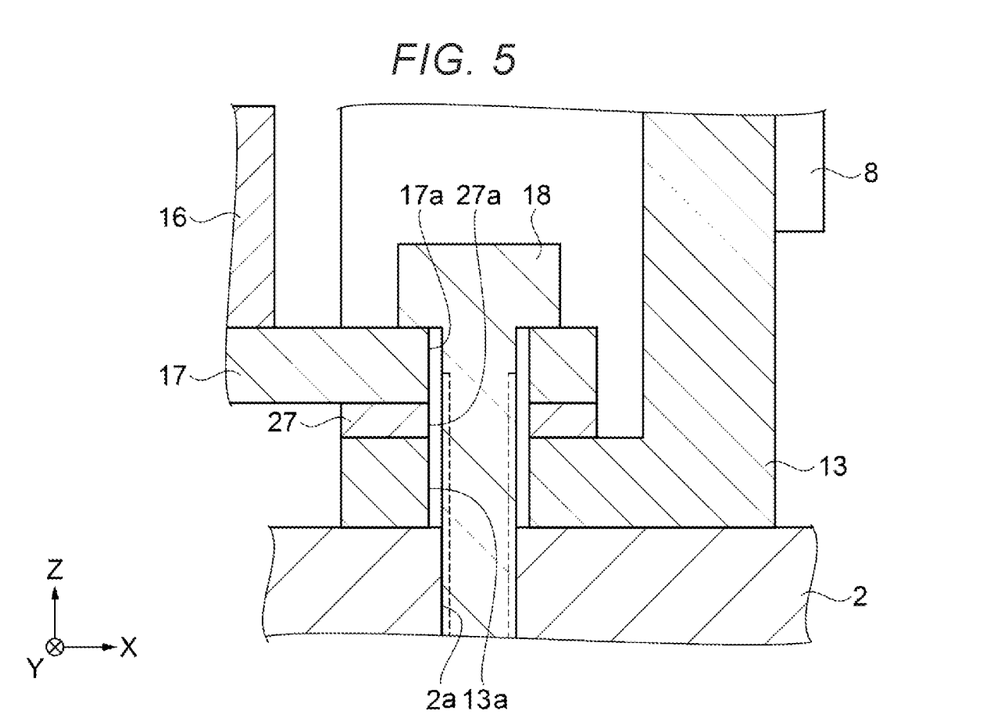
FIG. 5 is a schematic side sectional view of the main part showing the placement example of the monitoring device on the first leg portion.

As shown in FIG. 5, the plate 17 includes a first through hole 17a. The spacer 27 includes a second through hole 27a. The first leg portion 13 includes a third through hole 13a. The base 2 includes a screw hole 2a in which a female thread is formed. The bolt 18 is screwed into the screw hole 2a through the first through hole 17a, the second through hole 27a, and the third through hole 13a. Therefore, the bolt 18 may apply a large force to the spacer 27. Not the bolt 18, but a rod screw and a nut may be screwed in place of the bolt 18.

According to the configuration, the first leg portion 13 and the plate 17 are fixed by the bolt 18 with the spacer 27 in between. The spacer 27 is pressed against the first leg portion 13 by the bolt 18. The spacer 27 is softer than the plate 17 and, even when the surface of the first leg portion 13 is uneven, the plate 17 is in close contact with the surface of the first leg portion 13. Therefore, the vibration of the first leg portion 13 is reliably transmitted to the sensor unit 16 via the spacer 27 and the plate 17. As a result, the monitoring device 15 may accurately detect the vibration of the vacuum pump 1. Note that the vibration generation sources are originally the first bearing 23 and the second bearing 24, however, the housing 3, the first leg portion 13, and the monitoring device 15 vibrated by the first bearing 23 and the second bearing 24 are also regarded as the vibration generation sources.

The material of the spacer 27 is a metal having Vickers hardness from 50 to 150. Specifically, the material of the spacer 27 is preferably brass. The material of the plate 17 is preferably an aluminum alloy having Brinell hardness from 150 to 165. In the embodiment, for example, A7075 is used for the material of the plate 17. The length of the plate 17 in the X directions is preferably equal to or less than 5.5 times of the thickness of the plate 17. The monitoring device 15 may suppress the vibration of the plate 17.

According to the configuration, the Vickers hardness of the spacer 27 is equal to or more than 50, and thereby, the spacer 27 may suppress damping and transmit the vibration of the first leg portion 13 to the plate 17. Cast iron has Vickers hardness from 160 to 180. The Vickers hardness of the spacer 27 is equal to or less than 150, and thereby, even when the material of the first leg portion 13 is cast iron, the spacer 27 may be brought into close contact with the surface of the first leg portion 13.

The brass has Vickers hardness from 50 to 100. Therefore, the spacer 27 may suppress damping and transmit the vibration of the first leg portion 13 to the plate 17. Further, the monitoring device 15 may accurately detect vibration with the spacer 27 in close contact with the surface of the first leg portion 13.

Figure 6:
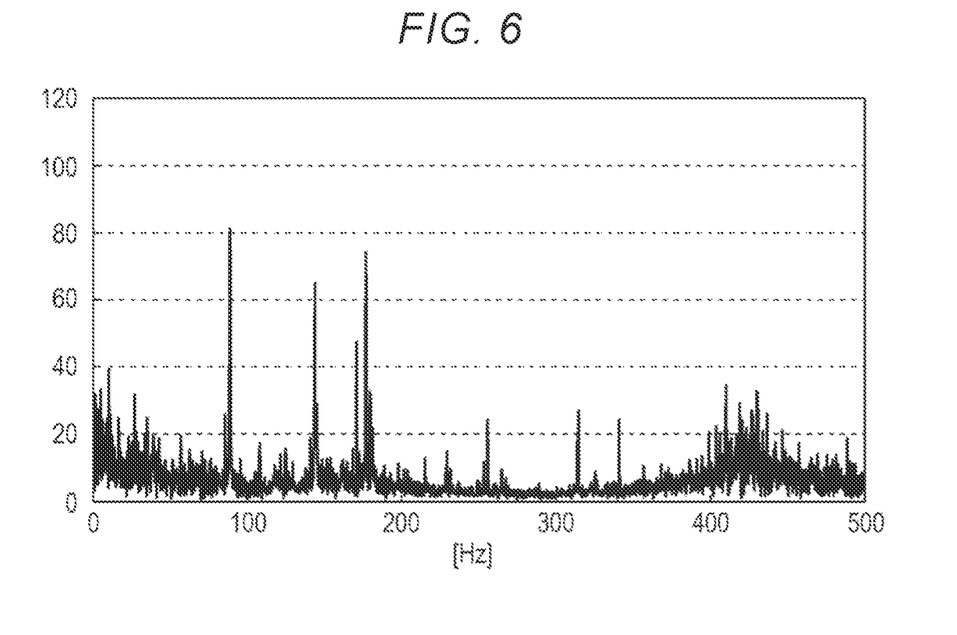
FIG. 6 shows a vibration measurement spectrum of the vacuum pump in a comparison example.
Figure 7:
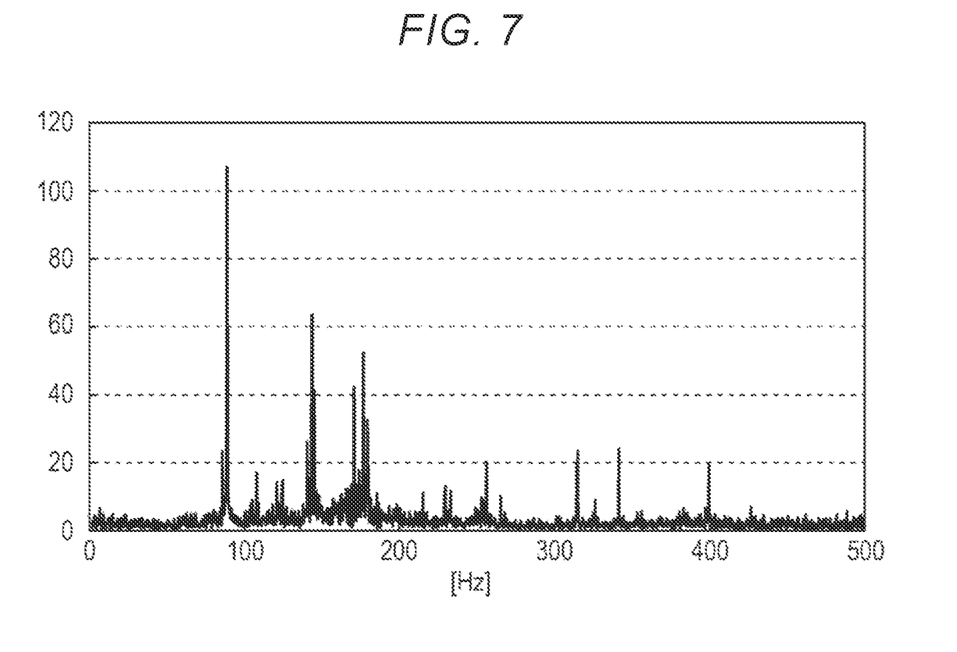
FIG. 7 shows a vibration measurement spectrum of the vacuum pump according to the first embodiment.

FIG. 6 shows a power spectrum when the sensor unit 16 detects the vibration of the vacuum pump 1 without the spacer 27. FIG. 7 shows a power spectrum when the sensor unit 16 detects the vibration of the vacuum pump 1 with the spacer 27. The horizontal axes in FIGS. 6 and 7 indicate frequencies and the vertical axes indicate intensity of vibration. In comparison between FIGS. 6 and 7, the vibration power is larger without the spacer 27 than that with the spacer 27 from 400 Hz to 500 Hz.

FIG. 6 shows that the vibration as noise is generated between the first leg portion 13 and the plate 17 at 500 Hz or less and from 400 Hz to 500 Hz. The spacer 27 is sandwiched between the first leg portion 13 and the plate 17, and thereby, no vibration is generated between the first leg portion 13 and the plate 17 and the noise component is reduced as shown in FIG. 7.

Figure 8:
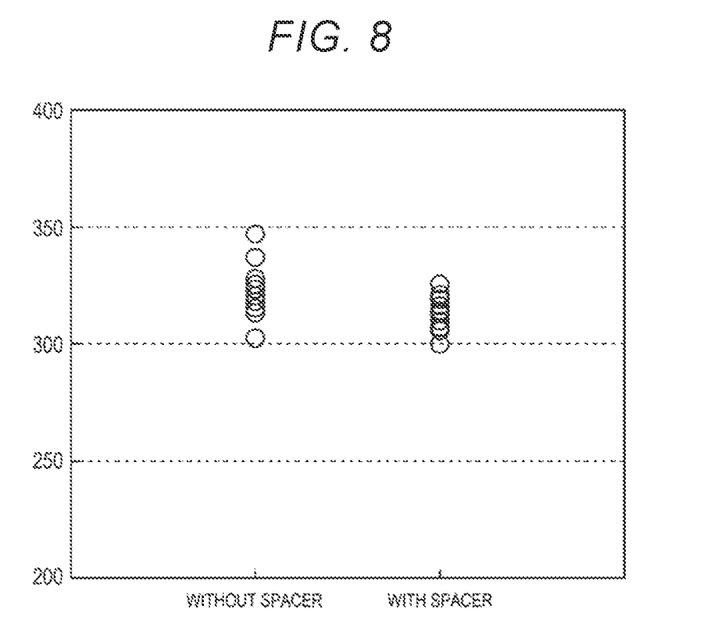
FIG. 8 is a diagram for explanation of variations of vibration measurement values at intermittent driving.

FIG. 8 shows effective values of vibration at respective times when the vacuum pump 1 is intermittently driven ten times. A difference between the maximum value and the minimum value of the effective values in data for ten times is referred to as "R value". The R value without the spacer 27 was 44.16. The R value with the spacer 27 was 24.46.

A standard deviation of the effective values in data for ten times is referred to as "σ". 6σ without the spacer 27 was 62.63. 6σ with the spacer 27 was 40.21. As described above, the spacer 27 is sandwiched between the first leg portion 13 and the plate 17, and thereby, variations of the effective values of the vibration may be reduced in the monitoring device 15.

Figure 9:
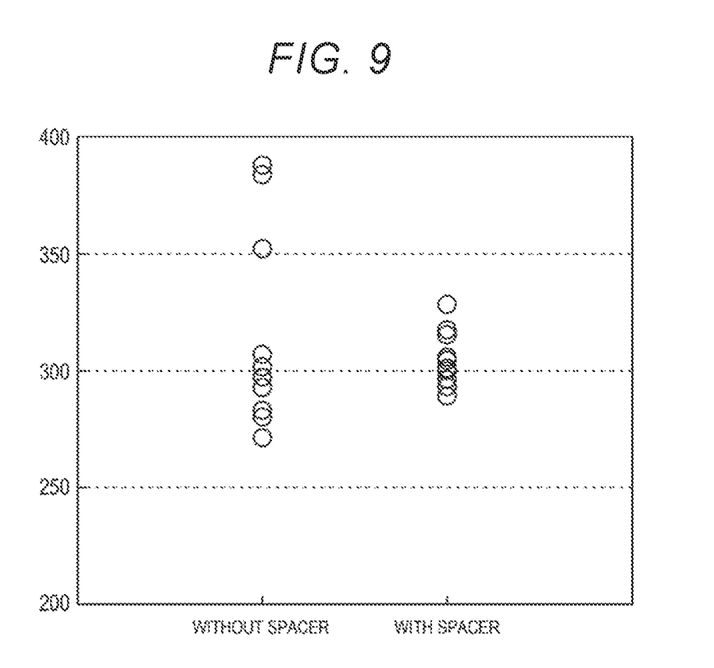
FIG. 9 is a diagram for explanation of variations of vibration measurement values when attachment and detachment of the monitoring device are repeated.

FIG. 9 shows effective values of vibration at respective times when the sensor unit 16 is attached and detached ten times and the vacuum pump 1 is driven at each time of attachment and detachment. The R value without the spacer 27 was 116.7. The R value with the spacer 27 was 40.5. 6σ without the spacer 27 was 257.7. 6σ with the spacer 27 was 73.4. As described above, the spacer 27 is sandwiched between the first leg portion 13 and the plate 17, and thereby, reproducibility of the measurement values when the monitoring device 15 is attached to and detached from the first leg portion 13 may be increased.

Sometimes the single sensor unit 16 is respectively attached to a plurality of vacuum pumps 1 and detects vibration. The spacer 27 is sandwiched between the first leg portion 13 and the plate 17, and thereby, reliability of the measurement values may be increased in the monitoring device 15.

Figure 10:
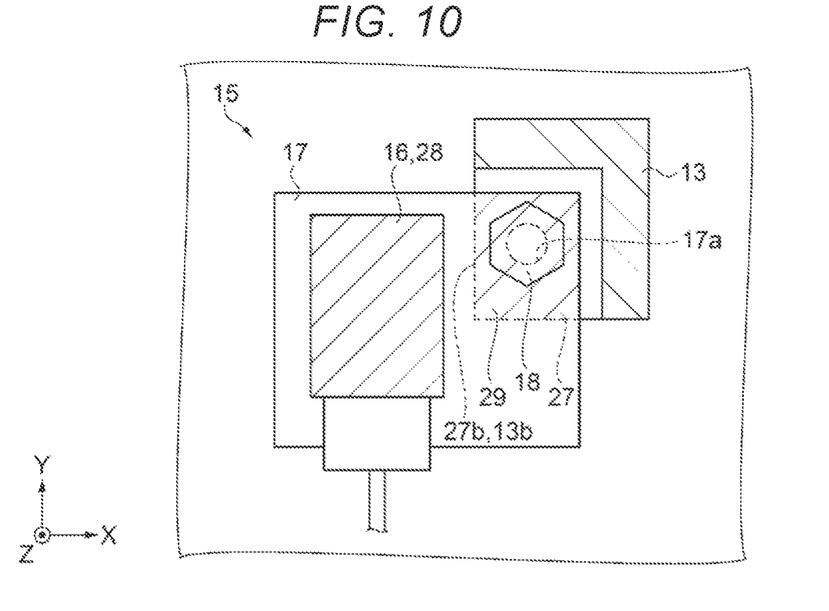
FIG. 10 is a schematic plan view of the main part showing the placement example of the monitoring device on the first leg portion.

As shown in FIG. 10, a first area 28 in which the sensor unit 16 contacts the plate 17 in a plan view of the plate 17 and a second area 29 in which the spacer 27 contacts the first leg portion 13 do not overlap. The first area 28 and the second area 29 are hatched areas in FIG. 10. The first area 28 is a part in which the sensor unit 16 and the plate 17 overlap. The second area 29 is a part in which the spacer 27 and the first leg portion 13 overlap. The plan view of the plate 17 refers to a view from a direction orthogonal to the plane of the plate 17. In FIG. 10, the plan view refers to a view as seen from the +Z direction.

According to the configuration, a part of the plate 17 and the spacer 27 overlap. Therefore, even when a location where the monitoring device 15 is placed on the first leg portion 13 is smaller than the plate 17, the monitoring device 15 may be placed on the first leg portion 13.

In the plan view of the plate 17, a first end 27b as an end at the sensor unit 16 side of the spacer 27 is the same as a second end 13b as an end at the sensor unit 16 side of the first leg portion 13.

According to the configuration, the first through hole 17a of the plate 17 is fixed by the bolt 18. The plate 17 is cantilevered and the sensor unit 16 side is a free end. The first end 27b of the spacer 27 at the sensor unit 16 side is the same as the second end 13b of the first leg portion 13. Compared to a case where the spacer 27 is recessed relative to the second end 13b of the first leg portion 13, the length of the projection of the plate 17 from the first end 27b is shorter, and the vibration of the plate 17 may be suppressed.

As described above, the vacuum pump 1 includes the pump rotors 19, the housing 3 housing the pump rotors 19, and the monitoring device 15 attached to the housing 3.

According to the configuration, the vacuum pump 1 vibrates when the pump rotors 19 are activated. The above described monitoring device 15 may accurately detect the vibration, and the vacuum pump 1 may be an apparatus including the monitoring device 15 that may accurately detect the vibration. An operator may check the degree of deterioration of the first bearing 23 or the second bearing 24 with reference to the output of the monitoring device 15.

The housing 3 includes the first leg portion 13 and the monitoring device 15 is attached to the first leg portion 13. According to the configuration, the monitoring device 15 is attached to the first leg portion 13. The first leg portion 13 has the third through hole 13a for fixing the vacuum pump 1 to the base 2 or a floor. The operator may easily place the monitoring device 15 in the vacuum pump 1 using the third through hole 13a and the bolt 18.

Second Embodiment

Figure 11:
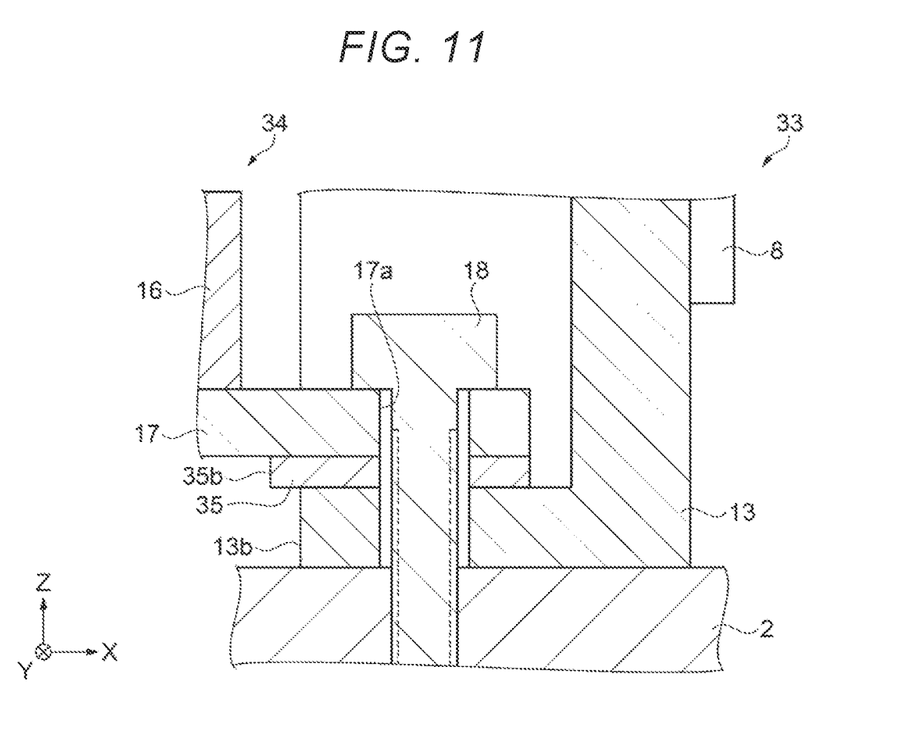
FIG. 11 is a schematic side view of a main part showing a placement example of a monitoring device on a first leg portion according to a second embodiment.

This embodiment is different from the first embodiment in that the shape of the spacer 27 is different. As shown in FIG. 11, a vacuum pump 33 as a vibration generation source and an apparatus includes the first leg portion 13. A monitoring device 34 is placed on the first leg portion 13. With a spacer 35, the plate 17, and the sensor unit 16 sequentially stacked, the monitoring device 34 is attached to the first leg portion 13 by the bolt 18.

In the plan view of the plate 17, a first end 35b as an end at the sensor unit 16 side of the spacer 35 projects toward the sensor unit 16 side relative to the second end 13b at the sensor unit 16 side of the first leg portion 13.

According to the configuration, the first through hole 17a of the plate 17 is fixed by the bolt 18. The plate 17 is cantilevered and the sensor unit 16 side is a free end. The first end 35b of the spacer 35 at the sensor unit 16 side projects relative to the second end 13b in an area in contact with the first leg portion 13, and thereby, compared to a case where the spacer 35 is recessed relative to the second end 13b of the first leg portion 13, the length of the projection of the plate 17 from the first end 35b is shorter and the vibration of the plate 17 may be suppressed.

Third Embodiment

Figure 12:
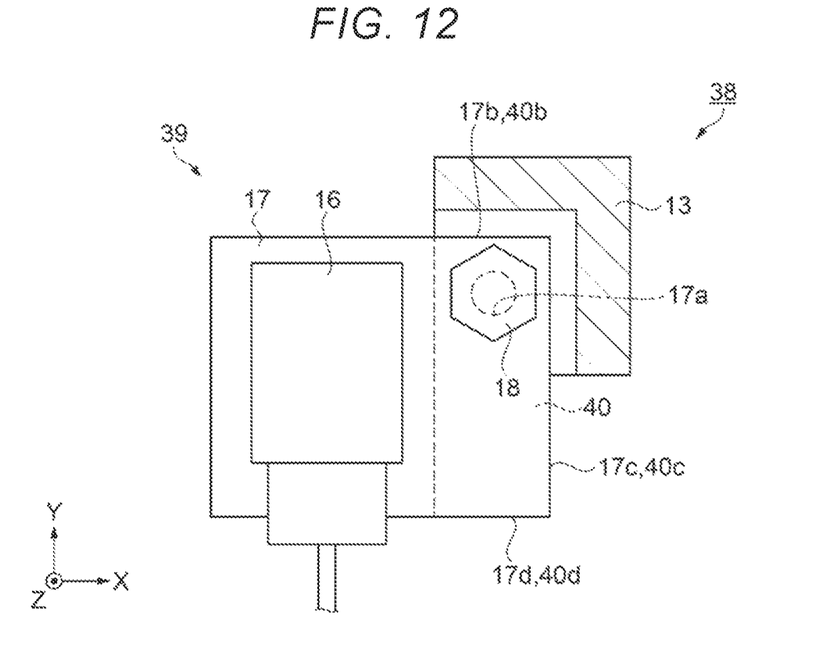
FIG. 12 is a schematic plan view of a main part showing a placement example of a monitoring device on a first leg portion according to a third embodiment.

This embodiment is different from the first embodiment in that the shape of the spacer 27 is different. As shown in FIG. 12, a vacuum pump 38 as a vibration generation source and an apparatus includes the first leg portion 13. A monitoring device 39 is placed on the first leg portion 13. With a spacer 40, the plate 17, and the sensor unit 16 sequentially stacked, the monitoring device 39 is attached to the first leg portion 13 by the bolt 18.

The plate 17 and the spacer 40 respectively have rectangular shapes. In the plan view of the plate 17, other sides than the side at the sensor unit 16 side of the spacer 40 overlap with the sides of the plate 17. Specifically, at the +Y direction side of the sensor unit 16, a first side 17b as the side of the plate 17 and a fifth side 40b as the side of the spacer 40 overlap. At the +X direction side of the sensor unit 16, a second side 17c as the side of the plate 17 and a sixth side 40c as the side of the spacer 40 overlap. At the −Y direction side of the sensor unit 16, a third side 17d as the side of the plate 17 and a seventh side 40d as the side of the spacer 40 overlap.

According to the configuration, the first through hole 17a of the plate 17 is fixed by the bolt 18. The plate 17 is cantilevered and the plate 17 at the other sides than that at the sensor unit 16 side vibrates. The other sides of the spacer 40 than that at the sensor unit 16 side are the same as the sides of the plate 17, and thereby, compared to a case where the spacer 40 is recessed relative to the end of the plate 17, the vibration of the plate 17 may be suppressed.

Fourth Embodiment

Figure 13:
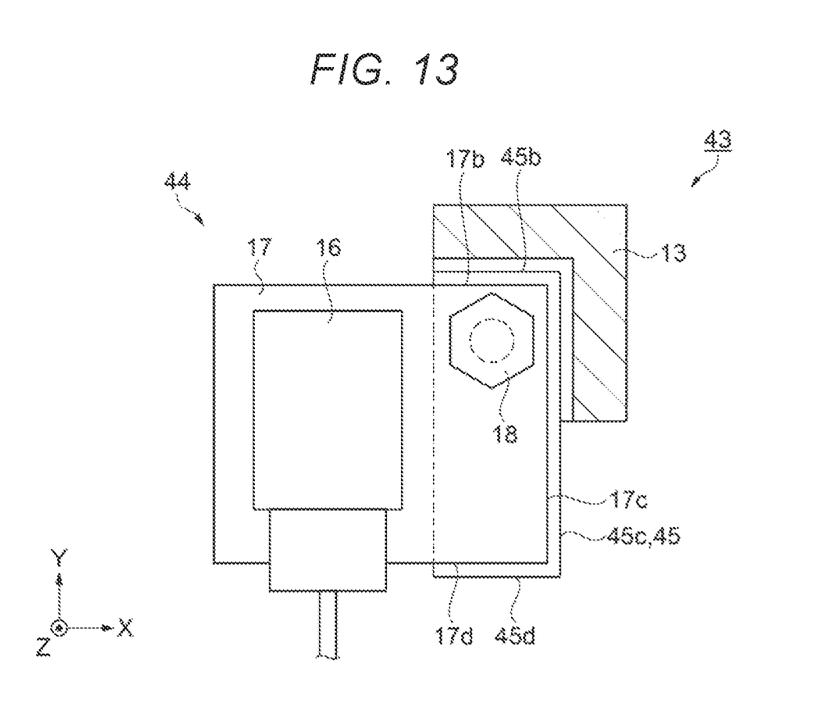
FIG. 13 is a schematic plan view of a main part showing a placement example of a monitoring device on a first leg portion according to a fourth embodiment.

This embodiment is different from the third embodiment in that the shape of the spacer 40 is different. As shown in FIG. 13, a vacuum pump 43 as a vibration generation source and an apparatus includes the first leg portion 13. A monitoring device 44 is placed on the first leg portion 13. With a spacer 45, the plate 17, and the sensor unit 16 sequentially stacked, the monitoring device 44 is attached to the first leg portion 13 by the bolt 18.

The plate 17 and the spacer 45 respectively have rectangular shapes. In the plan view of the plate 17, other sides than the side at the sensor unit 16 side of the spacer 45 project to the outer sides than the sides of the plate 17. Specifically, at the +Y direction side of the sensor unit 16, a fifth side 45b as the side of the spacer 45 projects relative to the first side 17b of the plate 17. At the +X direction side of the sensor unit 16, a sixth side 45c as the side of the spacer 45 projects relative to the second side 17c of the plate 17. At the −Y direction side of the sensor unit 16, a seventh side 45d as the side of the spacer 45 projects relative to the third side 17d of the plate 17.

According to the configuration, the first through hole 17a of the plate 17 is fixed by the bolt 18. The plate 17 is cantilevered and the plate 17 at the other sides than that at the sensor unit 16 side vibrates. The other sides of the spacer 45 than that at the sensor unit 16 side project to the outer sides than the sides of the plate 17, and thereby, compared to a case where the spacer 45 is recessed relative to the end of the plate 17, the vibration of the plate 17 may be suppressed.

Fifth Embodiment

Figure 14:
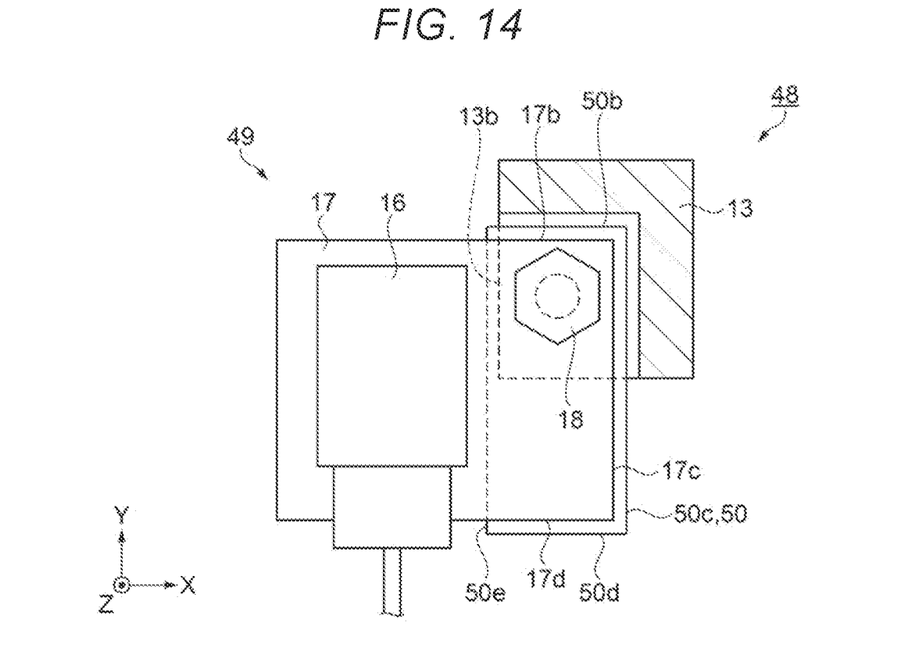
FIG. 14 is a schematic plan view of a main part showing a placement example of a monitoring device on a first leg portion according to a fifth embodiment.

This embodiment is different from the fourth embodiment in that the shape of the spacer 45 is different. As shown in FIG. 14, a vacuum pump 48 as a vibration generation source and an apparatus includes the first leg portion 13. A monitoring device 49 is placed on the first leg portion 13. With a spacer 50, the plate 17, and the sensor unit 16 sequentially stacked, the monitoring device 49 is attached to the first leg portion 13 by the bolt 18.

The plate 17 and the spacer 50 respectively have rectangular shapes. In the plan view of the plate 17, other sides than the side at the sensor unit 16 side of the spacer 50 project to the outer sides than the sides of the plate 17. Specifically, at the +Y direction side of the sensor unit 16, a fifth side 50b as the side of the spacer 50 projects relative to the first side 17b of the plate 17. At the +X direction side of the sensor unit 16, a sixth side 50c as the side of the spacer 50 projects relative to the second side 17c of the plate 17. At the −Y direction side of the sensor unit 16, a seventh side 50d as the side of the spacer 50 projects relative to the third side 17d of the plate 17.

In the plan view of the plate 17, an eighth side 50e as an end at the sensor unit 16 side of the spacer 50 projects toward the sensor unit 16 side relative to the second end 13b at the sensor unit 16 side of the first leg portion 13.

According to the configuration, the first through hole 17a of the plate 17 is fixed by the bolt 18. The plate 17 is cantilevered and the plate 17 at the other sides than that at the sensor unit 16 side vibrates. The other sides of the spacer 50 than that at the sensor unit 16 side project to the outer sides than the sides of the plate 17, and thereby, compared to a case where the spacer 50 is recessed relative to the end of the plate 17, the vibration of the plate 17 may be suppressed. The eighth side 50e of the spacer 50 at the sensor unit 16 side projects toward the sensor unit 16 side relative to the second end 13b of the first leg portion 13, and thereby, compared to a case where the spacer 50 is recessed relative to the second end 13b of the first leg portion 13, the vibration of the plate 17 may be suppressed.

Sixth Embodiment

Figure 15:
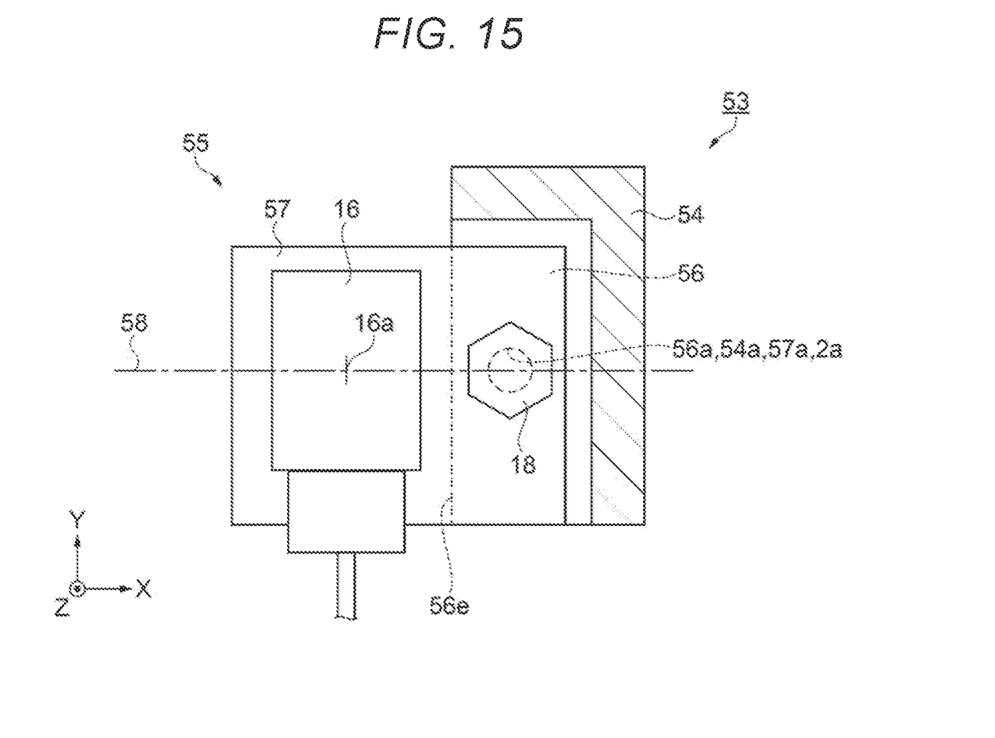
FIG. 15 is a schematic plan view of a main part showing a placement example of a monitoring device on a first leg portion according to a sixth embodiment.

This embodiment is different from the first embodiment in that the relative positions of the bolt 18 and the sensor unit 16 are different. As shown in FIG. 15, a vacuum pump 53 as a vibration generation source and an apparatus includes a first leg portion 54. A monitoring device 55 is placed on the first leg portion 54. With a spacer 56, a plate 57, and the sensor unit 16 sequentially stacked, the monitoring device 55 is attached to the first leg portion 54 by the bolt 18. The plate 57 includes a first through hole 57a as a through hole. The spacer 56 includes a second through hole 56a. The first leg portion 54 includes a third through hole 54a. The bolt 18 is screwed into the screw hole 2a of the base 2 through the first through hole 57a, the second through hole 56a, and the third through hole 54a.

The spacer 56 has a rectangular shape. In the plan view of the plate 57, the sensor unit 16 is located on an imaginary line 58 being orthogonal to an eighth side 56e as a side at the sensor unit 16 side of the spacer 56 and passing through the first through hole 57a of the plate 57. Specifically, the imaginary line 58 passes through the center of the first through hole 57a. According to the configuration, the vibration in the mode in which the plate 57 rotates and twists around the imaginary line 58 may be suppressed.

A center of gravity 16a of the sensor unit 16 is located on the imaginary line 58. According to the configuration, the vibration in the mode in which the plate 57 rotates and twists around the imaginary line 58 may be suppressed.

Seventh Embodiment

In the first embodiment, the material of the spacer 27 is a metal. The material of the spacer 27 may be a plastic having Rockwell hardness from 40 to 120. According to the configuration, the Rockwell hardness is equal to or more than 40, and thereby, the spacer 27 may suppress damping and transmit the vibration of the first leg portion 13 to the plate 17. The Rockwell hardness is equal to or less than 120, and thereby, the plastic material is easily available.

The material of the spacer 27 is preferably one of monomer cast nylon, polyoxymethylene resin, and polyetheretherketone resin. According to the configuration, the material of the spacer 27 is a heat-resistant plastic and, even when the temperature of the first leg portion 13 becomes higher, the spacer 27 may suppress damping and transmit the vibration of the first leg portion 13 to the plate 17.

Eighth Embodiment

In the first embodiment, the monitoring device 15 is placed on the first leg portion 13. The monitoring device 15 may be placed on the housing 3, the first side wall 8, the second side wall 9, the intake pipe 11, or the exhaust pipe 12. Also, in this case, the monitoring device 15 may accurately detect the vibration of the vacuum pump 1.

Ninth Embodiment

In the first embodiment, the spacer 27, the plate 17, and the sensor unit 16 sequentially stacked are attached to the first leg portion 13 by the bolt 18. When attached to another part of the housing 3 than the first leg portion 13, the spacer 27, the plate 17, and the sensor unit 16 sequentially stacked from the housing 3 may be attached by the bolt 18. The stacking direction is not limited, but may be any one of the +Z direction, the −Z direction, the +X direction, the −X direction, the +Y direction, and the −Y direction.

Tenth Embodiment

In the first embodiment, the monitoring device 15 is placed in the vacuum pump 1. The monitoring device 15 may be placed in an apparatus having a movable unit such as a three-dimensional printer or a robot. The monitoring device 15 may accurately detect the vibration of the apparatus. The vacuum pump 1 is exemplified as the vibration generation source and the apparatus, however, the type thereof is not particularly limited. The vibration generation source and the apparatus may be various apparatuses having rotation mechanisms including e.g. a hydraulic pump and a water pump.

What is claimed is:

1. A monitoring device attached to a vibration generation source and detecting vibration generated in the vibration generation source, comprising:
   a sensor unit including an inertial sensor;
   a plate on which the sensor unit is placed;
   a spacer in contact with the vibration generation source; and
   a screw configured to attach the spacer, the plate, and the sensor unit sequentially stacked to the vibration generation source, wherein
   the spacer is softer than the plate.

2. The monitoring device according to claim 1, wherein an area in which the sensor unit contacts the plate in a plan view of the plate and an area in which the spacer contacts the vibration generation source do not overlap.

3. The monitoring device according to claim 2, wherein in the plan view of the plate, an end at the sensor unit side of the spacer is the same as an end at the sensor unit side of the vibration generation source.

4. The monitoring device according to claim 2, wherein in the plan view of the plate, an end at the sensor unit side of the spacer projects toward the sensor unit side relative to an end at the sensor unit side of the vibration generation source.

5. The monitoring device according to claim 3, wherein the plate and the spacer respectively have rectangular shapes, and
   in the plan view of the plate, other sides than that at the sensor unit side of the spacer overlap with sides of the plate.

6. The monitoring device according to claim 3, wherein the plate and the spacer respectively have rectangular shapes, and
   in the plan view of the plate, other sides than that at the sensor unit side of the spacer project to outer sides than sides of the plate.

7. The monitoring device according to claim 1, wherein the spacer has a rectangular shape, and
   in the plan view of the plate, the sensor unit is located on an imaginary line being orthogonal to a side at the sensor unit side of the spacer and passing through a through hole of the plate.

8. The monitoring device according to claim 7, wherein a center of gravity of the sensor unit is located on the imaginary line.

9. The monitoring device according to claim 1, wherein a material of the spacer is a plastic having Rockwell hardness from 40 to 120.

10. The monitoring device according to claim 9, wherein the material of the spacer is one of monomer cast nylon, polyoxymethylene resin, and polyetheretherketone resin.

11. The monitoring device according to claim 1, wherein a material of the spacer is a metal having Vickers hardness from 50 to 150.

12. The monitoring device according to claim 11, wherein the material of the spacer is brass.

13. An apparatus comprising:
    a movable body;
    a housing housing the movable body; and
    the monitoring device according to claim 1 attached to the housing.

14. The apparatus according to claim 13, wherein the housing includes a leg portion, and
    the monitoring device is attached to the leg portion.

* * * * *